Feb. 1, 1966          QUIN SHEN          3,232,449
BAR SEPARATOR AND FEEDER
Filed Oct. 14, 1963          3 Sheets-Sheet 1
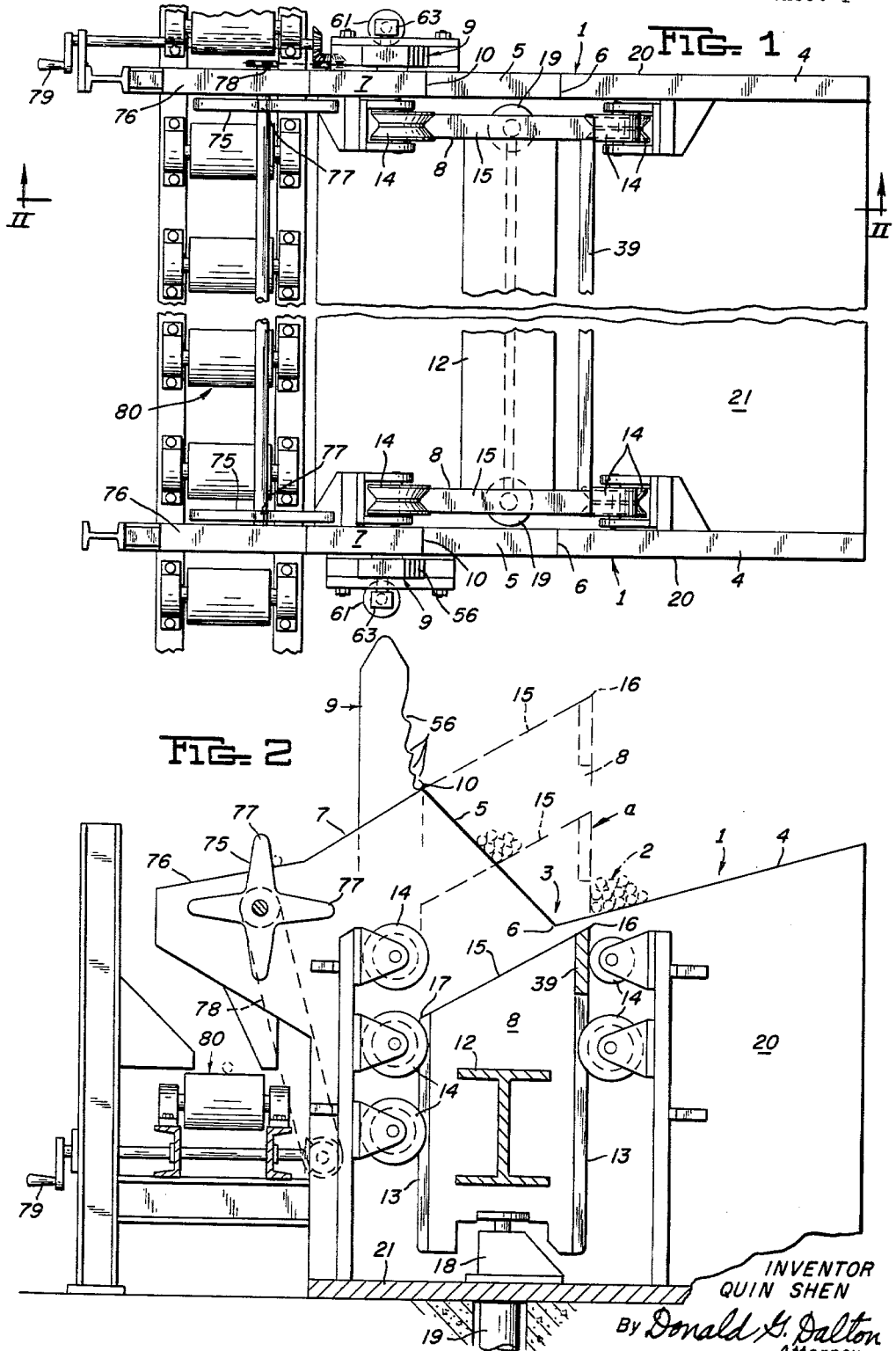
INVENTOR
QUIN SHEN
By Donald G. Dalton
Attorney

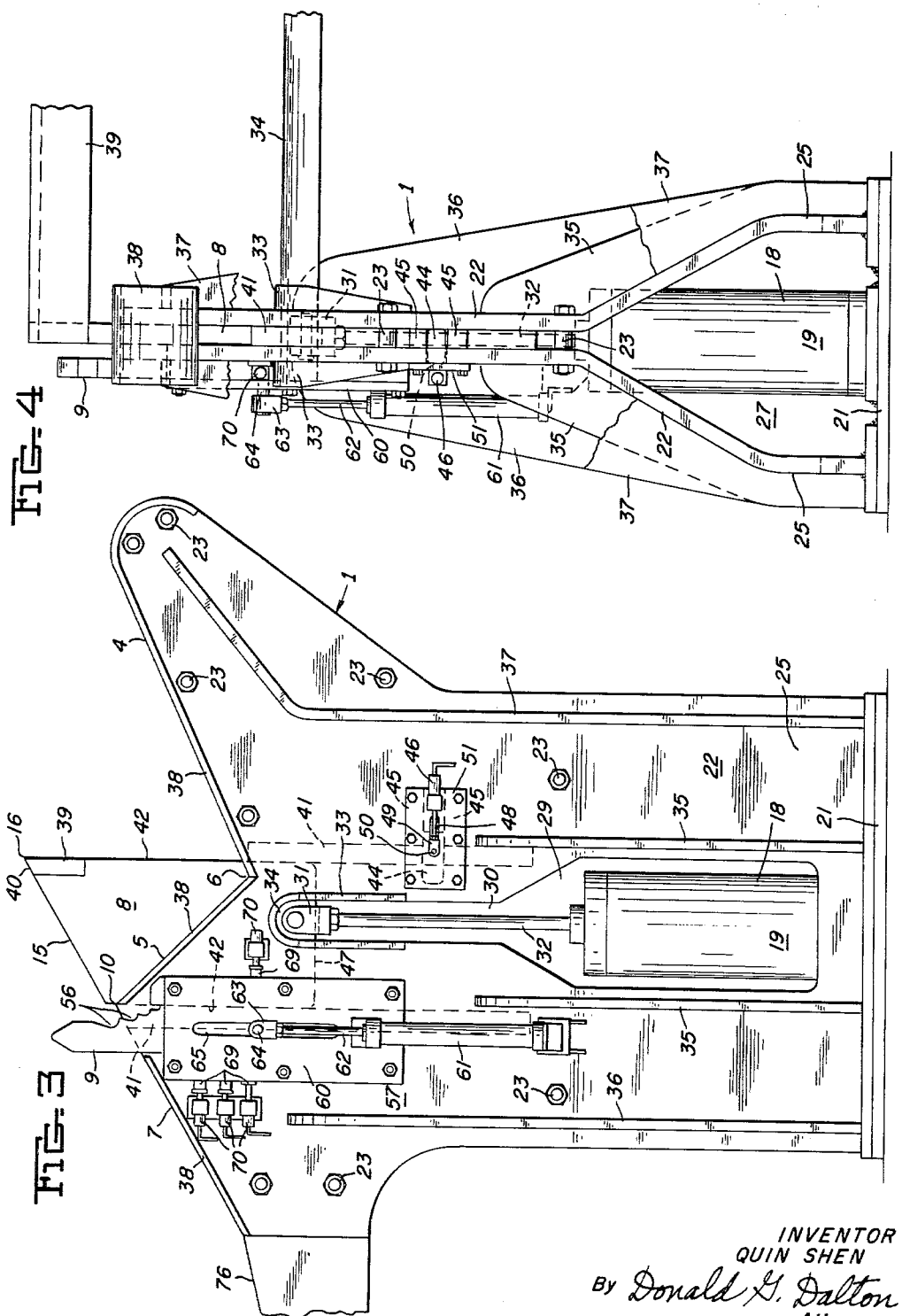

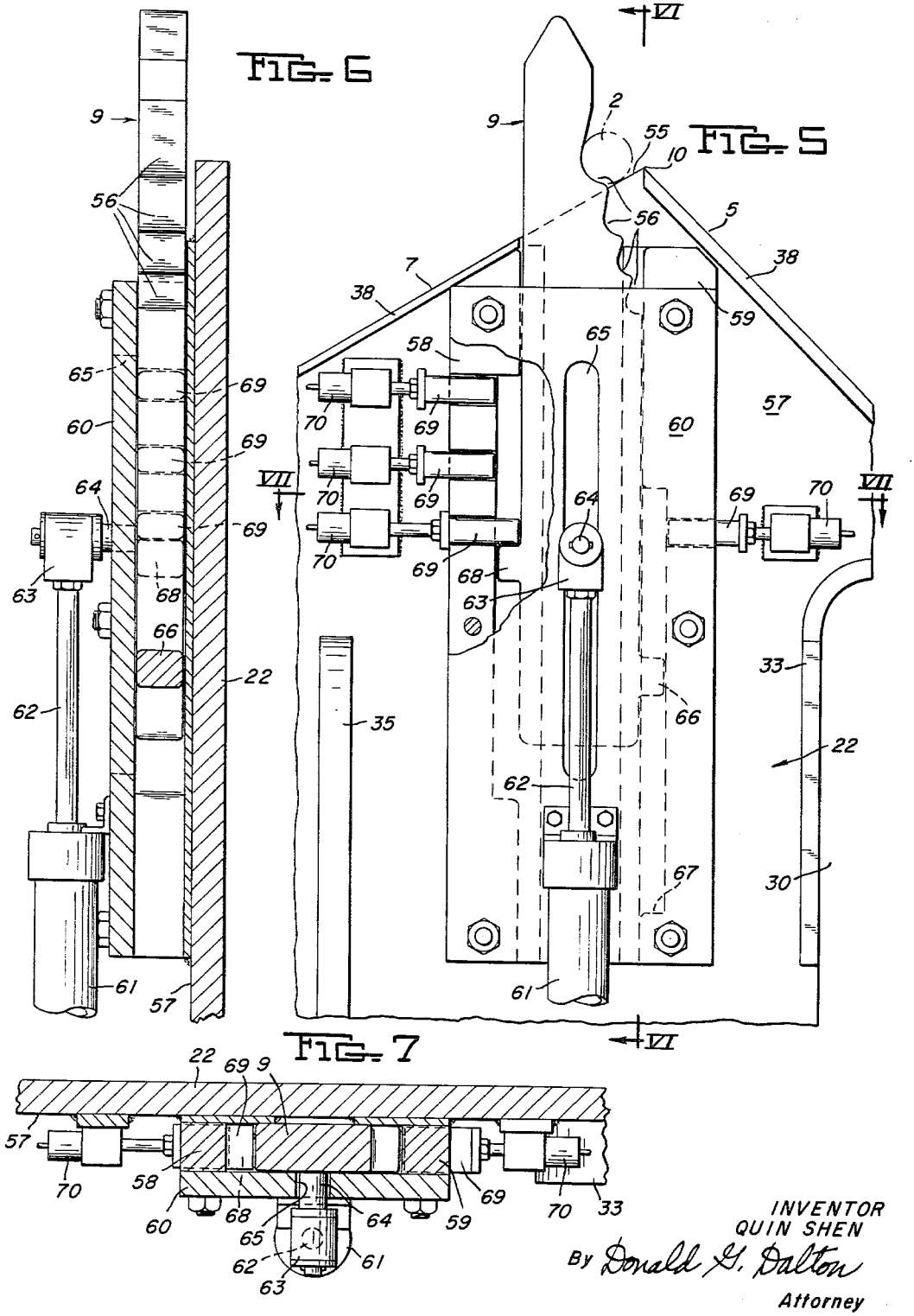

United States Patent Office 3,232,449
Patented Feb. 1, 1966

3,232,449
BAR SEPARATOR AND FEEDER
Quin Shen, Forest Hills Borough, Pa., assignor to United States Steel Corporation, a corporation of New Jersey
Filed Oct. 14, 1963, Ser. No. 316,034
17 Claims. (Cl. 214—1)

This invention relates to apparatus for separating bundles of elongated articles, such as rods, bars, tubes and the like, for delivery to a straightening machine or other processing mechanism.

Rods, bars and the like are customarily bundled for transfer between successive processing stations in a steel mill. At these stations, the bundles must be taken apart so that the bars or other articles may be fed singly to the processing equipment. This frequently is a manual operation that requires the services of two operators using hooks to separate and slide the articles over separating beds or skids to the processing equipment or a feeding conveyor therefor.

One of the objects of the invention is to provide an apparatus that reduces the manual labor required for separating and feeding a bundle of bars or other elongated articles to straightening machines and the like. Related objects are to increase the rate at which the articles can be fed to the processing equipment and to provide an apparatus which is adjustable to handle bars or tubes of different sizes.

A further object of the invention is to provide an apparatus of the type indicated above with a support for receiving a bundle of articles to be separated and mechanism which will then operate mechanically to separate the articles and feed them to the processing apparatus.

Other objects and advantages will become apparent from the following description and the accompanying drawings, in which:

FIGURE 1 is a plan view of an apparatus constructed in accordance with the principles of this invention;

FIGURE 2 is a sectional view taken substantially along the line II—II of FIGURE 1;

FIGURE 3 is an end view showing a modified form of apparatus;

FIGURE 4 is a side view looking in a direction from the right of FIGURE 3;

FIGURE 5 is a fragmentary end view drawn to an enlarged scale and illustrating in greater detail the construction of one of the vertically movable and adjustable stops shown in FIGURE 3; and FIGURES 6 and 7 are sectional views taken respectively along the lines VI—VI and VII—VII of FIGURE 5.

Generally stated, the apparatus shown in the drawings comprises a pair of pedestals 1 in spaced parallel positions that are shaped to provide a trough-like support for a bundle of bars 2 or other elongated articles, and a mechanism that operates to mechanically separate the bars on the pedestals and to feed them singly to processing equipment or a conveyor therefor. Each of the pedestals 1, more specifically, has a V-shaped upper end that forms part of a trough 3 defined by skid surfaces 4 and 5 in which a bundle of bars 2 is supported. The skid surfaces 5 are upwardly inclined from their lower ends 6 at the apex of the V-shaped trough 3 for a purpose to be described. The upper ends of the pedestals 1 are further constructed to provide downwardly inclined skid surfaces 7 over which the articles 2 are fed or discharged after being separated from the bundle in the trough 3. Separation of the bars 2 from such bundle and their discharge over the skid surfaces 7 are effected by sequential vertical operation of elevator members 8 and vertically movable stops 9, which are arranged alongside each of the pedestals 1 and in conjunction with the skid surfaces 4, 5 and 7 comprise the mechanism for separating and feeding the articles to processing equipment.

When elevated, the members 8 operate to separate a bundle of articles 2 supported on the pedestals 1 into two portions, one of which is moved upwardly over the skid surfaces 5 to a position at the upper ends 10 thereof in which one of the articles 2 can move onto the discharge skid surfaces 7, while the other portion remains in the trough 3 on the supporting skid surfaces 4 as shown in FIGURE 2. The members 8 are in the form of vertical plates or slabs that are connected and held by an I-beam 12 in laterally spaced parallel positions along the facing sides of the pedestals 1. Vertical movement of the members 8 is guided by the engagement of V-shaped edges 13 on opposite sides thereof with V-shaped grooves in guide rollers 14 mounted on the pedestals 1. Each plate 8 has a downwardly sloping skid surface 15 along its upper edge the angular inclination of which is opposite that of the surfaces 5 and is generally parallel to the skid surfaces 4. The skid surfaces 15 have a length and a horizontal dimension such that their upper ends 16 are spaced to the right of the bottom or apex 6 of the V-shaped trough 3 as viewed in FIGURES 2 and 3 and thus lie under the trough skid surfaces 4 when the members 8 are in their lowermost positions. By reason of this arrangement of the points 16 relative to the trough bottom 6, vertical movement of the members 8 is effective to split a bundle of rods 2 into two portions and, if a single rod is supported in the trough 3, to elevate such rod. The lower ends 17 of the elevator surfaces 15 are vertically aligned with the upper ends 10 of the skid surfaces 5 so that the articles 2 will slide onto the skid surfaces 7 when the members 8 are moved to their uppermost positions. Vertical movement is imparted to the members 8 by fluid pressure motors 18 that have their cylinders 19 mounted in vertical positions under each of the separators 8. The fluid pressure motors 18 are preferably air motors that are connected with a source of air pressure under the control of valve mechanism (not shown).

In FIGURES 1 and 2 of the drawings, the pedestals 1 are illustrated as comprising slabs 20 that are mounted in vertical positions on a base plate 21. In the modification shown in the other figures, each pedestal 1 has a fabricated construction that comprises a pair of laterally spaced parallel plates 22 connected in spaced relation by spacer bolt assemblies 23. The lower ends 25 of the plates 22 are curved outwardly and have welded connections with the base plate 21. The curvature of the lower ends 25 provides space 27 for access to the fluid pressure motors 18 which have the lower ends of their cylinders 19 supported on the base plate 21, rather than extending below the plate 21 as in the modification shown in FIGURE 2. The side plates 22 further have portions removed at points centrally thereof to provide motor access openings 29 and vertical slots 30 that provide for vertical movement of clevis connections 31 between the upper ends of the piston rods 32 and the lower ends of the plates 8. U-shaped flanges 33 welded in position about the upper edges of the slots 30 operate as stops that engage with a U-shaped tie-bar 34 which moves vertically through the slots 30 and in this showing forms a connection between the lower ends of the plates 8 similar to that provided by the I-beam 12 in FIGURES 1 and 2. Rib plates 35, 36 and 37 reinforce the plates 22 against lateral movement. Wear plates 38 are arranged over the upper ends of the plates 22 and furnish the skid surfaces 4, 5 and 7 described above in connection with FIGURES 1 and 2. The wear plates 38 have slots (not shown) extending lengthwise thereof and arranged centrally between their side edges to provide for vertical movement of the members 8.

The upper ends of the members 8 are further connected by a tie-bar 39 that has a bevel surface 40 along its upper edge which has the same slope as the elevator skid surfaces 15 and extends inwardly from the tips 16 thereof. The tie-bar 39 improves the ability of the apparatus to separate a bundle of tangled bars 2 into two portions in that it, more specifically, eliminates the tendency of a bar 2 to hang on one of the members 8 and thus move to a position in which one end is over the skid surface 4 and the other end is over the skid surface 5. The wear plate 38 of course has a transverse slot (not shown) that provides for vertical movement of the tie-bar 39.

In the modification shown in FIGURE 3, vertical movement of the plates 8 is guided by parallel guides 41 that are arranged in vertical positions between the pedestal plates 22 and have sliding engagement with the opposite edges 42 of the plates that form the members 8.

In the lowermost position of the members 8 shown in FIGURE 2, the skid surfaces 15 are arranged below the trough skid surfaces 4 and 5. When elevated by the motors 18 to their uppermost positions the surfaces 15 form extensions of the discharge skid surfaces 7 as shown in dotted lines in FIGURE 2, or are arranged slightly above the skid surfaces 7 as shown in solid lines in FIGURE 3, so that a bar 2 may gravitate from the surfaces 15 onto the surfaces 7. During upward movement from their lowermost positions to separate a bundle of rods 2 into two portions, the members 8 move through the middle or intermediate position $a$ shown in dotted lines in FIGURE 2 of the drawings in which a bundle of bars 2 is separated into two portions with one portion supported by the surfaces 5 and 15. After separation of the bars 2 into two portions in this manner, the members 8 are preferably operated back and forth between the intermediate position $a$ and their uppermost positions until all of the bars are discharged from the surfaces 15 onto the surfaces 7 in a manner to be described. To facilitate operation of the members 8 in this manner, stops 44 are provided for holding the members 8 against movement below the intermediate position $a$. As best shown in FIGURES 3 and 4 of the drawings, each stop 44 is supported for sliding movement by a pair of guide blocks 45 in the space between the plates 22 and extends through a slot in one of the plates 22. An air motor 46 controls the movement of the stop 44 between an operative position in which it is in the path of vertical movement of and engages the bottom edge 47 of the member 8 to hold it against movement below its intermediate position $a$, and a withdrawn position out of the path of vertical movement of the member 8 to its lowermost position as shown in FIGURE 2 of the drawings. For this purpose, the piston rod 48 of the air motor 46 has a connection 49 at its outer end with a pin 50 that is fastened to the stop 44 and extends through a horizontal slot in a plate 51 secured to the side plate 22. After all of the bars on the skid surfaces 15 have been discharged onto the skid surfaces 7, the motors 46 are operated to move the stops 44 to their withdrawn positions so that the members 8 can be lowered to their lowermost positions from which they can be operated again to remove another group of bars from the trough 3 for discharge movement onto the skid surfaces 7.

The stop bars 9 operate in conjunction with the upper end portions 55 of the skid surfaces 7 to receive a single bar or article 2 from a bundle that has been raised by movement of the members 8 to their uppermost positions, and to temporarily hold such article against downward movement over the skid surfaces 7. For this purpose, each stop bar 9 has a series of vertically spaced notches 56 along an upper side edge thereof that are respectively shaped according to the sizes of the articles to be handled. The notches 56 when positioned in the path of movement of the articles over the skid surfaces 7 by vertical adjustment of the bars 9 provide surface areas 55 (FIGURE 5) that are part of the skid surfaces 7 to the left of the points 10 of a size such that only one of the rods 2 can be supported thereon. In other words, the largest notch 56 at the top of the stop bar 9 is used to handle rods 2 of largest diameter and the smallest notch 56 for rods of smallest diameter, the intermediate notches 56 being used for rods of intermediate sizes. After a rod 2 is received on the skid surface areas 55 in a position held by the stop bars 9, the elevator members 8 are lowered to return the remainder of the bars on the elevator surfaces 15 over the skid surfaces 5 to the intermediate position $a$. The stops 9 are then lowered to a retracted position below the skid surfaces 7 to release the rod 2 on the skid surface areas 55 for downward feeding movement over the skid surfaces 7. The bars 9 are thereafter elevated to their operative positions projecting above the skid surfaces 7 for holding the next rod fed onto the skid surfaces 55 by a subsequent upward movement of the elevator members 8.

The stop bars 9 are arranged along the outwardly facing surfaces 57 of the pedestals 1 over which each has its movement guided vertically as best shown in FIGURES 5–7 by a pair of side guides 58 and 59 and a cover plate 60. Vertical movement is imparted to the bars 9 by air motors 61 that have upwardly projecting piston rods 62 with operating connections 63 at their upper ends to pins 64 which are fastened to the bars 9 and extend through vertical slots 65 in the cover plates 60. Each bar 9 moves between a lower retracted position that is determined by engagement of a lug 66 projecting from one side of the bar 9 with a stop surface 67 on the side guide 59, in which the upper end of the bar 9 is positioned below the skid surface 7, and a selected one of several upper positions in which one of the notches 56 is positioned for holding a rod 2 on the skid surface areas 55. The upper position of each bar 9 is selected by engagement of its lug 66 or a similar bar lug 68 projecting from an opposite side of the bar 9 with one of a plurality of stops 69 that are mounted for movement in openings in the side guides 58 and 59 to and from positions in the path of movement of the lugs 66 or 68. The stops 69 normally occupy positions out of the path of movement of the lugs 66 and 68 from which they are actuated by air motors 70 to operative positions in the path of movement of the lugs 66 or 68. The number of stops 69 corresponds to the number of notches 56 and such stops are operated selectively to position the notches 56 along the skid surfaces 55 according to the sizes of the rods 2 or articles that are to be fed onto the skid surface areas 55.

The apparatus described above is conditioned for operation by actuating the air motors 18 to lower the elevator members 8 to their lowermost positions in which their upper surfaces 15 are positioned below both skid surfaces 4 and 5 as shown in FIGURE 1 of the drawings. The stops 69 for the stop bar notches 56 corresponding to the size of rod 2 being handled are then moved to operative stopping positions by selective operation of their air motors 70 so that subsequent operation of the air motors 61 will move the bars 9 to stop positions projecting above the skid surfaces 7. Thereafter, the motors 18 are operated to raise the members 8 to their uppermost positions for movement of one of the articles 2 onto the skid surface areas 55 to a position in which it is held by one of the notches 56 of the stop bars 9. After one of the rods 2 has moved onto the skid surface areas 55 in this manner, the members 8 are lowered to their intermediate positions $a$ and, in so moving, the remainder of the rods 2 supported on their skid surfaces 15 move downwardly over the skid surfaces 5. Next the stop bars 9 are lowered to release the rod or article on the skid surface areas 55 for movement downwardly over the discharge skids 7, after which the bars 9 are returned to their operative stopping positions so that the members 8 may be moved again to their uppermost positions to separate another rod 2 and feed it downwardly over the skid 7. These operations are continued until all of the bars on the skid surfaces 15 have been fed downwardly over the skids 7. After this has been done, the stops 44 are moved to their retracted positions so that the members 8 may be lowered to their lowermost positions and elevated again to remove additional rods 2 from the trough 3. These operations are repeated until all of the rods 2 have been removed from the trough 3 and fed singly over the skids 7.

In the embodiment of the invention shown in FIGURES 1 and 2 of the drawings, star wheels 75 are provided on the pedestals 1 for controlling the movement of rods 2 over discharge skids 76 at the lower ends of the skids 7. The arms 77 of the wheels 75 project above the skids 76 and operate to interrupt the downward movement of the rods 2. After a rod has moved against a pair of star wheel arms 77 as shown in FIGURE 2 of the drawings, the wheels 75 are rotated in a counterclockwise direction as viewed in FIGURE 2 so that the rod 2 may continue its downward movement over the skid 76. The speed of rotation of the arm 77 controls the speed at which the rod 2 rolls downwardly over the skid 76 and such speed may be regulated to permit visual inspection of the surface of the rod 2. Rotation of the star wheels 75 is controlled manually by a chain drive 78 operated by a manual crank 79. When the articles 2 move to the lower ends of the skids 76 they gravitate downwardly onto a roller conveyor 80 over which they are delivered in an endwise direction to a straightening machine or other processing equipment.

While one embodiment of my invention has been shown and described it will be apparent that other adaptations and modifications may be made without departing from the scope of the following claims.

I claim:

1. Apparatus for separating and feeding elongated articles singly from a bundle comprising a support on which a bundle of said articles is loosely received, a pair of skids projecting upwardly and outwardly with respect to the said bundle on said support and respectively located at spaced points along the length thereof, means for moving a plurality of said articles upwardly over said skids from a first position on said support to a second position at the upper ends thereof, means effective upon movement of said articles to said second position for separating one of said articles out of said plurality of articles and for holding it against movement therefrom, said moving means being operable thereafter to lower the remainder of said articles over said skids, and means for operating said holding means to release said one article for movement out of said second position.

2. An apparatus as defined in claim 1 characterized by a conveyor means over which said one article is transferred in a sidewise direction from said second position upon releasing operation of said holding means.

3. Apparatus as defined in claim 2 characterized by said conveyor means comprising a pair of downwardly inclined skids over which said one article gravitates from said second position.

4. Apparatus for separating elongated articles from a bundle comprising a pair of upwardly inclined skids arranged in spaced parallel positions, means for moving a plurality of said articles upwardly over said skids to a position at the upper ends thereof, and means at the upper ends of said skids for holding one of said articles against movement while the remainder of said articles move downwardly over said skids comprising a support positioned outwardly with respect to the upper ends of said skids and onto which said one article is transferred upon movement to said position, and a stop means for holding said one article against movement on said support in a direction away from the upper ends of said skids.

5. Apparatus as defined in claim 4 characterized by said support comprising a second pair of skids inclined downwardly from the said upper ends of said first pair of skids.

6. Apparatus as defined in claim 4 characterized by said stop means comprising a pair of posts respectively mounted for vertical movement opposite the said upper ends of said skids, and means for lowering said posts to positions below the level of said support to release said one article for movement over said support.

7. Apparatus as defined in claim 6 characterized further by said posts having stop surfaces at different vertical levels positioned respectively different distances outwardly with respect to the said upper ends of said skids corresponding to the size of the object to be handled thereby, and means for adjusting the vertical position of said posts relative to said support according to the size of the object.

8. Apparatus for separating and feeding elongated articles singly from a bundle comprising a support on which a bundle of said articles is loosely received, a pair of skids projecting upwardly and outwardly with respect to the said bundle on said support and respectively located at spaced points along the length thereof, means for moving a plurality of said articles upwardly over said skids to a separating position at the upper end thereof, means effective upon movement of said articles to said separating position for engaging and holding one of said articles against movement, said moving means being thereafter operable to lower the remainder of said articles over said skids from said separating position, a conveyor means over which said one article is transferred in a sidewise direction from said separating position, and means for operating said holding means to release said one article for transfer movement over said conveyor means.

9. An apparatus as defined in claim 8 characterized by said support comprising a pair of spaced pedestals respectively having V-shaped upper ends that cooperate to form a V-shaped trough in which said bundle is received, and in which one side of each of said V-shaped upper ends forms the lower end of one of said skids.

10. Apparatus as defined in claim 9 characterized further by said article moving means comprising a vertically movable member having a downwardly sloping surface at its upper end on which said articles are supported while being moved upwardly over said skids.

11. Apparatus for separating elongated articles from a bundle comprising a pair of spaced pedestals respectively having V-shaped upper ends that cooperate to form a trough-like support for a bundle of said articles, a pair of separating members respectively mounted for vertical movement adjacent said pedestals, each of said members having a sloping surface at its upper end that has a horizontal dimension such that it underlies all of one side of one of said V-shaped upper ends and a portion of the other side thereof, said sloping surfaces diverging relative to said one side of said V-shaped upper ends, means for elevating said members to separate said bundle into two portions and to move one of said portions upwardly over the said one side of said trough, and a bar extending between the upper ends of said sloping surfaces to prevent one of said articles moving to a tangled position with one of its ends resting on one of said members and its other end resting on one of said pedestal upper ends.

12. Apparatus for separating and feeding elongated articles singly from a bundle comprising a support on which a bundle of said articles is loosely received, a pair of skids projecting upwardly and outwardly with respect to the said bundle on said support and respectively located at spaced points along the length thereof, means for moving a plurality of said articles upwardly over said skids comprising a pair of spaced separating members respectively mounted for vertical movement relative to said skids, each of said members having a sloping surface at its upper end that is inclined downwardly in an opposite direction relative to said skids and a horizontal dimension such that it extends over a horizontal distance between the upper ends of said skids and points beyond the lower ends of said skids, a bar extending between the said upper ends of the sloping surfaces on said separating members, and means for elevating said separating members to render their said sloping surfaces and bar effective to separate a bundle of said articles on said support into two portions, one of which is thereby moved upwardly over said skids.

13. Apparatus for separating and feeding elongated articles singly from a bundle comprising a support on which a bundle of said articles is loosely received, a pair of skids projecting upwardly and outwardly with respect to the said bundle on said support and respectively located at spaced points along the length thereof, means for moving a plurality of said articles upwardly over said skids comprising a pair of spaced separating members respectively mounted for vertical movement relative to said skids, each of said members having a sloping surface at its upper end that is inclined downwardly in an opposite direction relative to said skids, means effective upon movement of said articles to the upper ends of said skids for receiving and holding one of said articles while the remainder of said articles are lowered over said skids, transfer means over which said one article travels laterally from the position in which it is held by said holding means, and means for operating said holding means to release said one article for lateral movement over said transfer means.

14. Apparatus as defined in claim 13 characterized by said article receiving and holding means comprising article supporting surfaces at the upper ends of said skids to which said one article is transferred from the sloping surfaces on said vertically movable members, and a stop for engaging and holding said article against movement on said supporting surfaces in a direction away from the upper ends of said skids, said stop being movable by said operating means to a retracted position relative to said supporting surfaces to release said one article for movement over said transfer means.

15. Apparatus for separating and feeding elongated articles singly from a bundle comprising a support on which a bundle of said articles is loosely received, a pair of skids projecting upwardly and outwardly with respect to the said bundle on said support and respectively located at spaced points along the length thereof, means for moving a plurality of said articles upwardly over said skids comprising a pair of spaced separating members respectively mounted for vertical movement relative to said skids, each of said members having a sloping surface at its upper end that is inclined downwardly in an opposite direction relative to said skids, a second pair of skids extending outwardly and downwardly from the upper ends of said first pair of skids and to which said articles are transferred from said supporting surfaces upon movement to an article transfer position opposite the said upper ends, a pair of stops arranged inwardly from the upper ends of said first pair of skids a distance such that only one of said articles will be held thereon while the remainder are lowered over said first pair of skids, and means for moving said stops to retracted positions to release said one article for downward movement over said second pair of skids.

16. Apparatus as defined in claim 15 characterized by said pair of stops comprising a pair of posts respectively mounted for vertical movement opposite the upper ends of said first pair of skids, and means for lowering said posts to positions below the level of said second pair of skids to release said one article for movement over said second pair of skids.

17. Apparatus as defined in claim 16 characterized further by said posts having stop surfaces at different vertical levels positioned respectively different distances outwardly with respect to the said upper ends of said skids corresponding to the size of the object to be handled thereby, and means for adjusting the vertical position of said posts relative to said support according to the size of the object.

References Cited by the Examiner

UNITED STATES PATENTS

| 1,135,133 | 4/1915 | Pacheco | 221—187 X |
| 2,407,638 | 9/1937 | Gettig. | |
| 2,744,639 | 5/1956 | Evans. | |
| 2,837,200 | 6/1958 | Evans. | |
| 2,995,235 | 8/1961 | Maier | 198—219 X |

GERALD M. FORLENZA, *Primary Examiner.*

MARVIN A. CHAMPION, *Examiner.*